United States Patent
Qin

(10) Patent No.: US 10,882,933 B2
(45) Date of Patent: Jan. 5, 2021

(54) COPOLYMERIZATION OF POLYENES AND ALKENES

(71) Applicant: Bridgestone Corporation, Chuo-ku (JP)

(72) Inventor: Zengquan Qin, Nashville, TN (US)

(73) Assignee: Bridgestone Corporation, Chuo-ku (JP)

( * ) Notice: Subject to any disclaimer, the term of this patent is extended or adjusted under 35 U.S.C. 154(b) by 0 days.

(21) Appl. No.: 15/756,303

(22) PCT Filed: Aug. 14, 2016

(86) PCT No.: PCT/US2016/046951
§ 371 (c)(1),
(2) Date: Feb. 28, 2018

(87) PCT Pub. No.: WO2017/040005
PCT Pub. Date: Mar. 9, 2017

(65) Prior Publication Data
US 2019/0153134 A1 May 23, 2019

Related U.S. Application Data

(60) Provisional application No. 62/212,534, filed on Aug. 31, 2015.

(51) Int. Cl.
| C08F 236/04 | (2006.01) |
| C08F 236/06 | (2006.01) |
| C08F 4/68 | (2006.01) |
| C08F 210/06 | (2006.01) |
| C08F 4/76 | (2006.01) |

(52) U.S. Cl.
CPC .............. *C08F 210/06* (2013.01); *C08F 4/76* (2013.01); *C08F 236/04* (2013.01); *C08F 236/06* (2013.01); *C08F 2410/01* (2013.01)

(58) Field of Classification Search
CPC ........ C08F 4/68; C08F 210/16; C08F 210/18; C08F 236/04; C08F 236/06
See application file for complete search history.

(56) References Cited

U.S. PATENT DOCUMENTS

| 3,301,834 A | 1/1967 | Christman |
| 3,344,204 A | 9/1967 | Clough et al. |
| 3,470,144 A | 9/1969 | Minekawa et al. |
| 3,476,732 A | 11/1969 | Bayer et al. |
| 3,558,587 A | 1/1971 | Bayer et al. |
| 3,645,993 A | 2/1972 | Sunseri |
| 3,652,518 A | 3/1972 | Kawasaki et al. |
| 3,700,638 A | 10/1972 | Kawasaki et al. |
| 3,723,348 A | 3/1973 | Apotheker et al. |
| 3,914,207 A | 10/1975 | Xang |
| 3,940,378 A | 2/1976 | Furukawa et al. |
| 4,181,790 A | 1/1980 | Maahs et al. |
| 4,189,558 A | 2/1980 | Witte et al. |
| 4,263,171 A | 4/1981 | Shida et al. |
| 4,361,686 A | 11/1982 | Zaar et al. |
| 4,378,455 A | 3/1983 | Kawasaki et al. |
| 4,435,552 A | 3/1984 | Evens |
| 4,954,471 A | 9/1990 | Best |
| 5,089,460 A | 2/1992 | Chien |
| 5,728,911 A | 3/1998 | Hall |
| 6,150,483 A | 11/2000 | Renkema et al. |
| 7,262,258 B2 | 8/2007 | Kawashima et al. |
| 8,039,565 B2 | 10/2011 | Boisson et al. |
| 8,278,404 B2 | 10/2012 | Kawashima et al. |
| 8,853,339 B2 | 10/2014 | Kaita et al. |
| 8,921,499 B2 | 12/2014 | Shin et al. |
| 2002/0077433 A1 | 6/2002 | Becke et al. |
| 2005/0014914 A1* | 1/2005 | Kawashima .......... C08F 210/18 526/90 |

FOREIGN PATENT DOCUMENTS

| CN | 1264392 A | 8/2000 |
| DE | 1963780 A1 | 7/1970 |
| DE | 1964706 A1 | 9/1970 |
| DE | 2123802 B2 | 10/1974 |
| DE | 2117616 B2 | 3/1980 |
| GB | 1223750 A | 3/1971 |
| GB | 1338395 A | 11/1973 |
| GB | 1519473 A | 7/1978 |
| JP | 47028716 B | 7/1972 |
| JP | 47016182 B | 10/1972 |
| JP | 47051834 B | 12/1972 |
| JP | 49040632 B | 11/1974 |
| JP | 52005549 B | 2/1977 |
| SU | 761485 A1 | 9/1980 |
| SU | 954393 A1 | 8/1982 |
| SU | 954394 A1 | 8/1982 |

OTHER PUBLICATIONS

Kawasaki, Akihiro et al., "Alternating-Type Copolymerizations of Butadiene and Propylene II," Journal of Polymer Science Part B: Polymer Letters, vol. 7, Issue 8, pp. 613-620 (Aug. 1969).
Furukawa, Junji et al., "An Alternating Copolymer of Butadiene and Propylene," Journal of Polymer Science Part B: Polymer Letters, vol. 7, Issue 9, pp. 671-678 (Sep. 1969).
Furukawa, Junji et al., "Alternating Copolymer of Butadiene and Propylene III," Journal of Polymer Science Part A-1: Polymer Chemistry, vol. 10, Issue 3, pp. 681-688 (Mar. 1972).
Carman, Charles J., "The Determination of an Alternating Monomer Sequence Distribution in Propylene-Butadiene Copolymers Using Carbon-13 Nuclear Magnetic Resonance," Macromolecules, vol. 7, No. 6, pp. 789-793 (Nov.-Dec. 1974).
Furukawa, Junji, "Butadiene-Propylene Alternating Copolymers," Journal of Polymer Science, Polymer Symposia Rubber Elasticity Symposium), vol. 48, pp. 19-31 (Jan. 1974).

(Continued)

*Primary Examiner* — Caixia Lu
(74) *Attorney, Agent, or Firm* — Meredith E. Hooker; David G. Burleson

(57) ABSTRACT

Catalyst compositions that include a vanadium compound can be used to polymerize ethylenically unsaturated hydrocarbon monomers that include at least one polyene and at least one C?2#191-C?8#191 α-olefin, with the presence of a highly halogenated ketone increasing the activity of the catalyst composition while not negatively impacting the relative percentage (molar) of olefin mer incorporation.

20 Claims, No Drawings

(56) References Cited

OTHER PUBLICATIONS

Wieder, W. et al., "Improved Coordination Catalyst for the Alternating Copolymerization of Butadiene and Propylene," Journal of Applied Polymer Science, vol. 26, Issue 8, pp. 2503-2508 (Aug. 1981).

Wieder, W. et al., "Alternating Copolymers of Butadiene and Propylene: Properties and Characterization," Journal of Applied Polymer Science, vol. 27, Issue 10, pp. 3639-49 (Oct. 1982).

Su, Dan et al., "The Effect of Ethers on Alternating Copolymerization of Butadiene and Propylene Catalyzed by Vanadium-Aluminum System," Chinese Journal of Polymer Science, vol. 6, No. 1, pp. 56-63 (1988).

Jiao, Shuke et al., "The Effect and Function of AliBu2OR' on Butadiene-Propylene Alternating Copolymerization catalyzed by VO(OR)2C1-AliBu3 System," Chinese Journal of Polymer Science, vol. 6, No. 2, pp. 135-145 (1988).

Su, Dan et al., "The Effect of the Third Component on Butadiene—Propylene Alternating Copolymerization Catalyzed by Vanadium—Aluminum System," Journal of Polymer Science Part a: Polymer Chemistry, vol. 27, Issue 11, pp. 3769-3778 (Oct. 1989).

Arnold, Manfred et al., "Alternating Copolymerization of Butadiene and Propene with the Catalyst Vo(ONeo)2 Cl/Al(i-C4H9)3, 1," Die Makromolekulare Chemie, vol. 192, Issue 4, pp. 1017-23 (Apr. 1991).

Podol'nyi, Yu. B. et al., "Aspects of the copolymerization of butadiene with propylene under the influence of catalytic systems based on trialkoxysiloxy derivatives of vanadium and titanium," Polymer Science U.S.S.R., vol. 33, Issue 3, pp. 436-442 (1991).

Boor, Jr., John, "Modification of Ziegler-Natta Catalysts by Third Components," Ziegler-Natta Catalysts Polymerizations, Chapter 9, pp. 213-243 (1979).

CNIPA examination report in Chinese Patent Application No. 201680060320.3, 6 pp. (dated Nov. 2, 2018).

Jiao, Shuke et al., "Studies of the Alternating Copolymerization of Butadiene and Propylene in the Presence of Chloro-Vanadate-Triisobutylaluminium Catalyst System," Chemical Journal of Chinese Universities, vol. 3, No. 1, (1982).

* cited by examiner

COPOLYMERIZATION OF POLYENES AND ALKENES

CROSS REFERENCE TO RELATED APPLICATION

This application is a national stage entry of international application no. PCT/US2016/046951, filed 14 Aug. 2016, which claims the benefit of U.S. provisional patent application No. 62/212,534, filed 31 Aug. 2015, the disclosure of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04. Vulcanizates are provided by heat-induced crosslinking of the elastomers in such compositions.

Various natural and synthetic elastomeric materials are used in the manufacture of vulcanizates such as, e.g., tire components. Some of the most commonly employed synthetic materials include polybutadiene, often made by processes employing catalysts, and substantially random styrene/butadiene interpolymers, often made by processes employing free radical or anionic initiators.

Polymers with high levels of cis-1,4 microstructure can be provided from catalyst compositions based on Group 3 (including lanthanides) metal complexes, while catalyst compositions based on vanadium are known to yield polymers having high levels of trans-1,4 microstructure. For more information on such catalyst compositions, the interested reader is directed to, for example, U.S. Pat. Nos. 3,260,708, 3,652,518, 3,652,519, 3,824,224, 3,914,207, 4,189,558, 4,378,455, 5,527,951 and 6,566,465.

Of particular difficulty to synthesize are interpolymers of 1,2-alkenes (commonly referred to as α-olefins) and polyenes, particularly conjugated dienes. This is due in large part to the very different reactivities of those two types of ethylenically unsaturated monomers, specifically, their vastly different susceptibilities to coordinate with the metal atoms of polymerization catalysts. Advantageously, some of the aforementioned V complex-based catalyst compositions can copolymerize these monomers, although this ability often is limited to polymerizations conducted at very low temperatures, e.g., below −40° C. and often near −80° C.

Although difficult to synthesize, such interpolymers are of significant commercial interest. Because polyene and olefinic monomers usually originate from different raw materials and are provided via different techniques, manufacturers of elastomeric materials can guard against supply and price disruptions of either type of monomer by synthesizing interpolymers with varying and/or adjustable amounts of mer from each.

Additionally, certain portions of pneumatic tires, particularly sidewalls, preferably exhibit good resistance to atmospheric degradation, particularly that due to ozone. Such components can benefit from inclusion of substantially saturated elastomer(s). Historically, typical options have included ethylene/propylene/non-conjugated diene (EPDM) interpolymers or brominated copolymers of isobutylene and para-methylstyrene. Alternatives to these materials also remain desirable.

SUMMARY

Any of a class of highly halogenated ketones can be used as an ingredient of a catalyst composition that includes a vanadium complex.

The class of highly halogenated ketones can be represented by the general formula

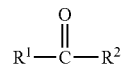

$$R^1 - \overset{\overset{\displaystyle O}{\|}}{C} - R^2 \qquad (I)$$

where each of $R^1$ and $R^2$ independently is a $C_1$-$C_8$ (hydro)haloalkyl group. $R^1$ and $R^2$ can be represented, respectively, by the general formulas $C_mQ_{2m+1}$ and $C_nQ_{2n+1}$ where Q is H or X, with X representing a halogen atom, and m and n each independently is an integer of from 1 to 8 inclusive. If z represents the total number of Q atoms in the highly halogenated ketone, i.e., $z=2(m+n+1)$, and y represents the total number of X atoms, i.e., those Qs which are halogen atoms, then z/y is from 1 to 2 inclusive. In some embodiments, y=z, i.e., the ketone is fully halogenated.

Catalyst compositions that include a vanadium complex, an alkylating agent and a highly halogenated ketone find particular utility in the polymerization of ethylenically unsaturated hydrocarbon monomers that include at least one polyene and at least one $C_2$-$C_8$ α-olefin, particularly $C_2$-$C_3$ α-olefins, and advantageously propene, i.e., propylene. The presence of a highly halogenated ketone increases the activity of the catalyst composition (i.e., permits it to convert a higher percentage of monomer to polymer) relative to an otherwise identical catalyst composition that does not contain a highly halogenated ketone, while not negatively impacting the relative percentage (molar) of olefin mer incorporation.

One aspect of the invention relates to a process of polymerizing ethylenically unsaturated hydrocarbon monomers. The method involves contacting the monomers with the aforedescribed catalyst composition. The ethylenically unsaturated hydrocarbon monomers advantageously include one or more types of polyene as well as at least one $C_2$-$C_8$ α-olefin. The polymerization can be conducted at temperatures that are more moderate than those necessary with many previously described V compound-based catalyst compositions, i.e., from ~0° to about −40° C., commonly from about −10° to about −30° C.

In other aspects are provided a catalyst composition that includes a formula (I) compound as well as methods of making the catalyst composition.

Also provided are compositions, including vulcanizates, that include particulate fillers and the resulting polymers, certain embodiments of which may also include terminal functionality, as are methods of providing and using such compositions.

Other aspects of the invention will be apparent to the ordinarily skilled artisan from the detailed description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" and "mer unit" both mean that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"substituted" means containing a heteroatom or functionality (e.g., hydrocarbyl group) that does not interfere with the intended purpose of the group in question;

"polyene" means a molecule, typically a monomer, with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"radical" means the portion of a molecule that remains after reacting with another molecule, regardless of whether any atoms are gained or lost as a result of the reaction;

"aryl" means a phenyl or polycyclic aromatic radical;

"aralkyl" means an alkyl radical that includes an aryl substituent, e.g., a benzyl group;

"alkaryl" means an aryl radical that includes an alkyl substituent;

"terminus" means an end of a polymeric chain;

"terminally active" means a polymer with a living or pseudo-living terminus; and "terminal moiety" means a group or functionality located at a terminus.

In the description that follows, microstructure characteristics can be determined by IR and NMR ($^{13}CC$ and $^{1}H$) spectroscopy, while both number average and weight average molecular weights, $M_n$ and $M_w$ respectively, can be determined by GPC using polystyrene standards for calibration and appropriate Mark-Houwink constants. Each of these techniques is familiar to an ordinarily skilled artisan.

Throughout this document, all values given in the form of percentages are weight percentages unless the surrounding text explicitly indicates a contrary intention. The relevant portion(s) of any specifically referenced patent and/or published patent application are incorporated herein by reference.

DETAILED DESCRIPTION OF ILLUSTRATIVE EMBODIMENTS

A catalyst composition according to the present invention can be used to polymerize ethylenically unsaturated monomers that include one or more types of polyene, optionally but in some respects preferably which include at least one type of conjugated diene. The term "catalyst composition" is intended to encompass a simple mixture of ingredients, a complex of various ingredients that results from physical or chemical forces of attraction, a chemical reaction product of some or all of the ingredients, or a combination of the foregoing.

The resulting polymer can be elastomeric, including mer units that themselves include ethylenic unsaturation. Mer units that include ethylenic unsaturation can be derived from polyenes, particularly dienes and trienes (e.g., myrcene). Illustrative polyenes include $C_4$-$C_{30}$ dienes, preferably $C_4$-$C_{12}$ dienes. Preferred among these are conjugated dienes such as, but not limited to, 1,3-butadiene, 1,3-pentadiene, 1,3-hexadiene, 1,3-octadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and the like.

Those polyene mer not incorporating into a polymer chain in a 1,2-microstructure can have either a cis or trans isomeric configuration. Polymers that have low levels of 1,2-vinyl configurations, which are desirable for certain end use applications, can be difficult or inefficient to achieve via free radical or anionic (living) polymerizations and, therefore, commonly are prepared by processes using catalysts.

The polymer also can include $C_2$-$C_8$ α-olefin mer. In certain embodiments, some or all of such mer can be $C_2$-$C_3$ α-olefin mer. A preferred $C_2$-$C_8$ α-olefin is propylene, and a preferred polymer is a copolymer of propylene and a polyene, particularly 1,3-butadiene.

The number average molecular weight ($M_n$) of a polymer produced according to the disclosed methods typically is such that a quenched sample exhibits a gum Mooney viscosity ($ML_{1-4}/100°$ C.) of from ~2 to ~150, more commonly from ~2.5 to ~125, even more commonly from ~5 to ~100, and most commonly from ~10 to ~75; the foregoing generally corresponds to a $M_n$ of from ~5,000 to ~250,000 Daltons, commonly from ~10,000 to ~200,000 Daltons, more commonly from ~50,000 to ~150,000 Daltons, and most commonly from ~10,000 to ~125,000 Daltons or even ~10,000 to ~100,000 Daltons. The resulting polymer typically has a molecular weight distribution of from 1 to 10, commonly from 1.5 to 7.5, and more commonly from 2 to 5.

The catalyst composition described summarily above and more fully below can be employed in solution polymerizations, which afford exceptional control of polymer properties such as randomness, microstructure, etc. Solution polymerizations have been performed since about the mid-20th century, so the general aspects thereof are known to the ordinarily skilled artisan; nevertheless, certain aspects are provided here for convenience of reference.

Suitable solvents include those organic compounds that do not undergo polymerization or incorporation into propagating polymer chains (i.e., are inert toward and unaffected by the catalyst composition). Preferred organic compounds are liquid at ambient temperature and pressure. Examples of suitable organic solvents include hydrocarbons with relatively low boiling points such as aromatic hydrocarbons and (cyclo)aliphatic hydrocarbons. Exemplary polymerization solvents include various $C_5$-$C_{12}$ cyclic and acyclic alkanes (e.g., n-pentane, n-hexane, n-heptane, n-octane, n-nonane, n-decane, isopentane, isohexanes, isooctanes, 2,2-dimethylbutane, cyclopentane, cyclohexane, methylcyclopentane, methylcyclohexane, etc.) as well as their alkylated derivatives, certain liquid aromatic compounds (e.g., benzene, toluene, xylenes, ethylbenzene, diethylbenzene, and mesitylene), petroleum ether, kerosene, petroleum spirits, and mixtures thereof. Other potentially suitable organic compounds that can be used as solvents include high-boiling hydrocarbons of high molecular weights such as paraffinic oil, aromatic oil, or other hydrocarbon oils that are commonly used to oil-extend polymers. The ordinarily skilled artisan is familiar with other useful solvent options and combinations.

Useful catalyst compositions include a compound that includes a V atom and a plurality of bonded atoms or groups or ligands, i.e., a V-containing compound. While most such compounds include V in a +5 oxidation state, this is not mandatory and, in fact, other components of the catalyst composition might result in a V-containing compound where V is in a reduced oxidation state.

Suitable V-containing compounds include, but are not limited to, carboxylates such as formates, acetates, (meth)acrylates, valerates, gluconates, citrates, fumarates, lactates, maleates, oxalates, 2-ethylhexanoates, neodecanoates (i.e., carboxylates made from trialkyl carboxylic acids such as Versatic™ acid, available from Momentive Specialty Chemicals Inc.), naphthenates, stearates, oleates, benzoates, picolinates and the like; organophosphates such as any of a variety of dialkyl phosphates, dioleyl phosphates, diphenyl and substituted diphenyl phosphates, butyl (2-ethylhexyl) phosphates, (1-methylheptyl) (2-ethylhexyl)phosphates, (2-ethylhexyl) (p-nonylphenyl)phosphates and the like; organophosphonates such as any of a variety of $C_4$-$C_{18}$ alkyl phosphonates and alkyl alkylphosponates, oleyl phosphonates, phenyl and substituted phenyl phosphonates and phenyl phenylphosponates, oleyl oleylphosphonates, phenyl phenylphosphonate, mixed alkyl phosphonates, and the like; organophosphinates such as any of a variety of $C_4$-$C_{18}$ alkyl and dialkyl phosphinates, oleyl and dioleyl phosphinates, phenyl and substituted phenyl and diphenyl phosphinates, mixed alkyl phosphinates, and the like; (thio)-carbamates such as any of a variety of $C_1$-$C_8$ dialkyl(thio) carbamates, dibenzyl(thio) carbamates and the like; xanthates such as any of a variety of $C_1$-$C_8$ alkyl xanthates, benzyl xanthates and the like; β-diketonates such as acetylacetonates, trifluoroacetylacetonates, hexafluoroacetyl-acetonates, benzoylacetonates, and 2,2,6,6-tetramethyl-3,5-heptanedionates and the like; alkoxides such as any of a variety of $C_1$-$C_8$ alkyl alkoxides and the like; aryloxides such as phenoxides and substituted phenoxides, naphthoxides and the like; siloxides; halides; oxyhalides (optionally solubilized with a Lewis base such as THF); oxoalkoxides; oxosiloxides; pseudohalides such as cyanides, (thio)cyanates, azides, ferrocyanides and the like; as well as organo-vanadium compounds such as those containing cyclopentadienyl, substituted cyclopentadienyl, allyl, and substituted allyl ligands.

As set forth more fully in the patent documents listed in the Background section, exemplary V-based complexes include but are not limited to vanadium oxyhalides (i.e., vanadyl trihalides); vanadium alkoxides; vanadium oxyalkoxides; vanadyl dialkoxy halides; vanadium triacetylacetonate; vanadium tribenzoylacetonate; vanadyl diacetylacetonate and the haloacetyl-acetonates; vanadyl trialcoholates and haloalcoholates, the tetrahydrofuranates, the etherates, the aminates of vanadium tri- and tetrachloride and of vanadyl trichloride; the pyridates of vanadium tri- and tetrachloride and of vanadyl trichloride; vanadium complex compounds such as those which include cyclopentadienyl, indenyl and/or fluorenyl rings; and vanadium salts of carboxylic acids such as vanadium oxydiacetate.

The catalyst composition also includes an activator, generally an alkylating agent, which often is an organometallic compound that can transfer hydrocarbyl groups to another metal. These agents typically are organometallic compounds of electropositive metals such as Groups 1, 2, and 3 metals. Exemplary alkylating agents include organoaluminum compounds such as those having the general formula $AlR^3_o X'_{3-o}$ where o is an integer of from 1 to 3 inclusive; each $R^3$ independently is a monovalent organic group, which may contain heteroatoms such as N, O, B, Si, S, P, and the like, connected to the Al atom via a C atom; and each X' independently is H, a halogen atom, a carboxylate group, an alkoxide group, or an aryloxide group. In one or more embodiments, each $R^1$ independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing from a single C atom, or the appropriate minimum number of C atoms to form the group, up to about 20 C atoms. These hydrocarbyl groups may contain heteroatoms including, but not limited to, N, O, B, Si, S, and P atoms. Non-limiting species of organoaluminum compounds within this general formula include trihydrocarbylaluminum compounds such as trimethylaluminum, triethylaluminum, triisobutylaluminum (TIBA), tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum;

dihydrocarbylaluminum hydrides such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolyli sobutyl aluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride;

hydrocarbylaluminum dihydrides such as ethylaluminum dihydride, n-propylaluminum dihydride, isopropylaluminum dihydride, n-butylaluminum dihydride, isobutylaluminum dihydride, and n-octylaluminum dihydride;

dihydrocarbylaluminum carboxylates;

hydrocarbylaluminum bis(carboxylate)s;

dihydrocarbylaluminum alkoxides;

hydrocarbylaluminum dialkoxides;

dihydrocarbylaluminum halides such as diethylaluminum chloride (DEAC), di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, ptolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-noctylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride;

hydrocarbylaluminum dihalides such as ethylaluminum dichloride (EADC), n-propylaluminum dichloride, isopropylaluminum dichloride, n-butylaluminum dichloride, isobutylaluminum dichloride, and n-octylaluminum dichloride;

dihydrocarbylaluminum aryloxides; and hydrocarbylaluminum diaryloxides.

In certain embodiments, the alkylating agent can include trihydrocarbylaluminum, dihydrocarbylaluminum hydride, and/or hydrocarbylaluminum dihydride.

Other organoaluminum compounds that can serve as activators, i.e., alkylating agents, include but are not limited to dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Aluminoxanes constitute another class of organoaluminum compounds suitable for use as an activator, i.e., alkylating agent. (These compounds also can serve as activators after the alkylating activity is complete.) This class includes oligomeric linear aluminoxanes and oligomeric cyclic aluminoxanes, formulas for both being provided in a variety of references including, for example, U.S. Pat. No. 8,017,695. (Where the oligomeric type of compound is used as an alkylating agent, the number of moles refers to the number of moles of Al atoms rather than the number of moles of oligomeric molecules, a convention commonly employed in the art of catalyst systems utilizing aluminoxanes.)

Aluminoxanes can be prepared by reacting trihydrocarbylaluminum compounds with water. This reaction can be performed according to known methods such as, for example, (1) dissolving the trihydrocarbylaluminum compound in an organic solvent and then contacting it with water, (2) reacting the trihydrocarbylaluminum compound with water of crystallization contained in, for example, metal salts, or water adsorbed in inorganic or organic compounds, or (3) reacting the trihydrocarbylaluminum compound with water in the presence of the monomer(s) to be polymerized.

Suitable aluminoxane compounds include, but are not limited to, methylaluminoxane (MAO), modified methylaluminoxane (MMAO, formed by substituting ~20 to 80% of the methyl groups of MAO with $C_2$-$C_{12}$ hydrocarbyl groups, preferably with isobutyl groups, using known techniques), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methyl-cyclopentylaluminoxane, phenylaluminoxane, and 2,6-dimethylphenylaluminoxane.

Aluminoxanes can be used alone or in combination with other organoaluminum compounds. In one embodiment, MAO and at least one other organoaluminum compound such as diisobutyl aluminum hydride can be employed in combination. The interested reader is directed to U.S. Pat. No. 8,017,695 for other examples of aluminoxanes and organoaluminum compounds employed in combination.

Also suitable as activators (alkylating agents) are organomagnesium compounds such as those having the general formula $R^4_g MgX'_{2-g}$ where X' is defined as above, g is 1 or 2, and $R^4$ is the same as $R^3$ except that each monovalent organic group is connected to the Mg atom via a C atom. Potentially useful organomagnesium compounds include, but are not limited to, diethylmagnesium, di-n-propylmagnesium, diisopropylmagnesium, dibutylmagnesium, dihexylmagnesium, diphenylmagnesium, dibenzylmagnesium, hydrocarbylmagnesium hydride (e.g., methylmagnesium hydride, ethylmagnesium hydride, butylmagnesium hydride, hexylmagnesium hydride, phenylmagnesium hydride, and benzylmagnesium hydride), hydrocarbylmagnesium halide (e.g., methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, and benzylmagnesium bromide), hydrocarbylmagnesium carboxylate (e.g., methylmagnesium hexanoate, ethylmagnesium hexanoate, butylmagnesium hexanoate, hexylmagnesium hexanoate, phenylmagnesium hexanoate, and benzylmagnesium hexanoate), hydrocarbylmagnesium alkoxide (e.g., methylmagnesium ethoxide, ethylmagnesium ethoxide, butylmagnesium ethoxide, hexylmagnesium ethoxide, phenylmagnesium ethoxide, and benzylmagnesium ethoxide), and hydrocarbylmagnesium aryloxide (e.g., methylmagnesium phenoxide, ethylmagnesium phenoxide, butylmagnesium phenoxide, hexylmagnesium phenoxide, phenylmagnesium phenoxide, and benzylmagnesium phenoxide).

The catalyst composition also can include a halogen source, a term that includes any substance that includes at least one labile halogen atom. In one embodiment, at least a portion of the halogen source can be provided by either of the other two foregoing components of the catalyst composition, i.e., the V-containing compound (e.g., a halide, oxyhalide, etc.) and/or the above-described activator (alkylating agent), when one or both of those compounds contain at least one labile halogen atom.

At least a portion of the halogen source can be in the form of one or more separate and distinct halogen-containing compounds. Various compounds, or mixtures thereof, that contain one or more labile halogen atoms can be employed as the halogen source, with those that have good solubility in hydrocarbon liquids (solvents) being preferred, although those with limited solubility can be suspended in a polymerization system to form the catalytically active species.

Useful halogen-containing compounds that can be employed as at least a portion of the halogen source include, but are not limited to, elemental halogens; mixed halogens such as iodine monochloride, iodine monobromide, iodine trichloride, iodine pentafluoride and the like; hydrogen halides such as HF, HCl, HBr and HI; organic halides such as t-butyl chloride or bromide, allyl chloride or bromide, benzyl chloride or bromide, chloro- or bromo-di-phenylmethane, triphenylmethyl chloride or bromide, benzylidene chloride or bromide, any of variety of alkyltrichlorosilanes and dialkyldichlorosilanes, benzoyl chloride or bromide, propionyl chloride or bromide, methyl chloroformate, methyl bromoformate and the like; inorganic halides such as $PCl_3$, $PBr_3$, $PCl_5$, $POCl_3$, $POBr_3$, $BCl_3$, $BBr_3$, $BF_3$, $SiF_4$, $SiCl_4$, $SiBr_4$, $SiI_4$, $AsCl_3$, $AsBr_3$, $AsI_3$, $SeCl_4$, $SeBr_4$, $TeCl_4$, $TeBr_4$, $TeI_4$ and the like; halides of metals (in any of a variety of oxidations states) such Sn, Al, Sb, Al, Ga, In, Ti, Zn and the like; as well as organometallic halides such as any of a variety of dialkylaluminum chlorides, bromides and fluorides, alkylaluminum dichlorides, dibromides and difluorides, alkylaluminum sesquichlorides, alkylmagnesium chlorides, bromides and iodides, phenylmagnesium chloride or bromide, benzylmagnesium chloride, trialkyltin chlorides and bromides, dialkyltin dichlorides and dibromides, and the like.

Catalyst compositions of the type just described have very high catalytic activity for polymerizing polyenes such as conjugated dienes into stereospecific polymers over a wide range of concentrations and ratios, although polymers having the most desirable properties typically are obtained from systems that employ a relatively narrow range of concentrations and ratios of ingredients. Advantageously, such catalyst compositions also can provide interpolymers of one or more polyenes with one or more $C_2$-$C_8$ α-olefins, preferably copolymers of a polyene, particularly 1,3-butadiene, and a $C_2$-$C_8$ α-olefin, particularly propylene.

Further, the catalyst composition ingredients are believed to interact to form an active catalyst species, so the optimum concentration for each ingredient can depend on the concentrations of the other ingredients. The following molar ratios are considered to be relatively exemplary for a variety of different systems based on the foregoing ingredients (with alkylating agent representing a preferred type of activator):

alkylating agent to V-containing compound: from ~1:1 to ~500:1, commonly from ~2:1 to ~200:1, typically from ~5:1 to ~100:1; and organoaluminum compound to V-containing compound: from ~1:1 to ~200:1, commonly from ~2:1 to ~150:1, typically from ~5:1 to ~100:1.

The molecular weight of polymers produced with a catalyst composition that includes a V-containing compound can be controlled by adjusting the amount of V-containing compound used and/or the amounts of co-catalyst compound concentrations within the catalyst composition; polymers having a wide range of molecular weights can be produced in this manner. In general, increasing the metallic complex and co-catalyst concentrations reduces the molecular weight of resulting polymers, although very low molecular weight polymers (e.g., liquid polydienes) require extremely high catalyst concentrations. Typically, this necessitates removal of catalyst residues from the polymer to avoid adverse effects such as retardation of the sulfur cure rate.

A catalyst composition that includes a V-containing compound can be formed using any of the following methods:

(1) In situ. The catalyst ingredients are added to a solution containing monomer and solvent (or simply bulk monomer). The addition can occur in a stepwise or simultaneous manner. In the case of the latter, the activator preferably is added first followed by the V-containing compound.

(2) Pre-mixed. The ingredients can be mixed outside the polymerization system, generally at a temperature of from −78° to 25° C., before being introduced to the monomer(s).

(3) Pre-formed in the presence of monomer(s). The catalyst ingredients are mixed in the presence of a small amount of monomer(s) at a temperature of from −78° to 25° C. The amount of monomer(s) can range from ~1 to ~500 moles, commonly from ~5 to ~250 moles, typically from ~10 to ~100 moles, per mole of the V-containing compound. The resulting catalyst composition is added to the remainder of the monomer(s) to be polymerized.

(4) Two-stage procedure.

(a) The activator is combined with the V-containing compound in the absence of monomer or in the presence of a small amount of monomer(s) at a temperature of from −78° to 25° C.

(b) The foregoing mixture and the remaining components are charged in either a stepwise or simultaneous manner to the remainder of the monomer(s) to be polymerized.

When a solution of one or more of the catalyst ingredients is prepared outside the polymerization system in the foregoing methods, an organic solvent or carrier preferably is employed; useful organic solvents include those mentioned previously. In other embodiments, one or more monomers can be used as a carrier or the catalyst ingredients can be employed neat, i.e., free of any solvent of other carrier.

Where a polydiene such as 1,3-butadiene is polymerized in the presence of a catalyst composition of the type just described, the resulting polydienes can have a trans-1,4-linkage content of at least 95%, at least 96%, at least 97%, at least 98%, or at least 99%, where the percentages are based upon the number of diene mer in trans-1,4 configuration relative to the total number of diene mer. As mentioned previously, such polymers can have a 1,2-linkage content that is less than 5%, less than 4%, less than 3%, less than 2% or even less than 1%. (The little remaining diene mer has a cis-1,4 configuration.)

Inclusion of a highly halogenated ketone, such as a general formula (I)-type compound, in the catalyst composition surprisingly can increase the activity of the catalyst composition (i.e., permit higher percentages of monomer to be polymerized) relative to an otherwise identical catalyst composition that does not contain a highly halogenated ketone. Advantageously, this increased activity can be achieved without a negative impact on the relative percentage (molar) of olefin mer incorporation.

In the class of compounds defined by general formula (I), each of $R^1$ and $R^2$ independently is a $C_1$-$C_8$ (hydro)haloalkyl group represented, respectively, by the general formulas $C_mQ_{2m+1}$ and $C_nQ_{2n+1}$ where Q, m and n are defined as above. Preferred values of m and n are, independently, from 1 to 4 inclusive.

Non-limiting examples of $R^1$ and $R^2$ groups include —$CX_3$, —$CHX_2$, —$CH_2CX_3$, —$CX_2CX_3$, —$CX_2CHX_2$, —$CH_2CX_2CX_3$, —$CX_2CH_2CX_3$, —$CX_2CX_2CHX_2$, —$CX_2CH_2CHX_2$, etc., with X being defined as above. Preferred are those highly halogenated ketones where each Q on a C atom adjacent to the carbonyl group (—C(O)—) is X.

If z represents the total number of Q atoms in the highly halogenated ketone, i.e., z=2 (m+n+1), and y represents the total number of X atoms, then z/y is from 1 to 2 inclusive, preferably from 1 to 1.75 inclusive, more preferably from 1 to 1.67 inclusive, even more preferably from 1 to 1.5 inclusive, still more preferably from 1 to 1.4 inclusive, further still more preferably from 1 to 1.33 inclusive, still yet more preferably from 1 to 1.25 inclusive, and most preferably from 1 to 1.15 inclusive. In certain preferred embodiments, the ketone is fully halogenated.

The amount of highly halogenated ketone(s) employed in the catalyst composition generally is fairly low, for example, a molar ratio of less than 5:1 relative to the moles of V employed. Common ketone-to-V molar ratios include those which are no more than 9:2, 4:1, 7:2, 3:1, 8:3, 5:2, 7:3, 2:1, 7:4, 5:3, 3:2, 4:3, 5:4, 1:1, 4:5, 3:4 or 2:3, with those which are greater than unitary being preferred In one or more embodiments, some or all of the catalyst composition can be supported on an inert carrier. The support can be a porous solid such as talc, a sheet silicate, an inorganic oxide or a finely divided polymer powder. Suitable inorganic oxides are oxides of elements from any of Groups 2-5 and 13-16. Exemplary supports include $SiO_2$, aluminum oxide, and also mixed oxides of the elements Ca, Al, Si, Mg or Ti and also corresponding oxide mixtures, Mg halides, styrene/divinylbenzene copolymers, polyethylene or polypropylene.

Polymers such as trans-1,4-polydiene and, advantageously, interpolymers and copolymers that include trans-1,4-diene mer, particularly alternating copolymers of butadiene, with the majority of its mer generally incorporated in a trans-1,4 configuration, and a $C_2$-$C_8$ α-olefin, particularly a $C_2$-$C_3$ α-olefin, and most particularly propylene, can be produced by polymerizing conjugated diene monomer(s) and at least one $C_2$-$C_8$ α-olefin, particularly a $C_2$-$C_3$ α-olefin (preferably propylene), in the presence of a catalytically effective amount of a catalyst composition as described above. The total catalyst concentration to be employed in the polymerization depends on the interplay of multiple factors such as the purity of ingredients, the polymerization temperature, the polymerization rate and conversion desired, and the molecular weight desired. Accordingly, a specific total catalyst concentration cannot be definitively set forth except to say that catalytically effective amounts of the respective catalyst ingredients should be used. The amount of the V-containing compound generally ranges from ~0.005 to ~5 mmol, commonly from ~0.01 to ~2 mmol, and typically from ~0.05 to ~1 mmol per 100 g monomer. All other ingredients generally can be added in amounts based on the amount of V-containing compound, with reference to the various ratios set forth above.

Polymerization preferably is carried out in one or more organic solvents of the type(s) set forth above, i.e., as a solution polymerization (where both the monomer(s) and the polymers formed are soluble in the solvent) or precipitation polymerization (where the monomer is in a condensed phase but the polymer products are insoluble). The catalyst ingredients preferably are solubilized or suspended in the organic liquid, and additional solvent (beyond that used in preparing the catalyst composition) usually is added to the polymerization system; the additional solvent(s) may be the same as or different from the solvent(s) used in preparing the catalyst composition. In one or more embodiments, the solvent content of the polymerization mixture may be more than 20%, more than 50%, or even more than 80% (by wt.) of the total weight of the polymerization mixture. The concentration of monomer present at the beginning of the polymerization generally ranges from ~3 to ~80%, commonly from ~5 to ~50%, and typically from ~10% to ~30% (by wt.).

In certain embodiments, a bulk polymerization system that includes no more than a minimal amount of solvent can be used, i.e., a bulk polymerization process where one or more of the monomers act(s) as the solvent. Examples of potentially useful bulk polymerization processes are disclosed in U.S. Pat. No. 7,351,776. In a bulk polymerization, the solvent content of the polymerization mixture may be less than ~20%, less than ~10%, or even less than ~5% (by wt.) of the total weight of the polymerization mixture. The polymerization mixture even can be substantially devoid of solvent, i.e., contain less than that amount of solvent which otherwise would have an appreciable impact on the polymerization process.

The polymerization can be conducted in any of a variety of reaction vessels. For example, solution polymerizations can be conducted in a stirred-tank reactor. Bulk polymerizations also can be conducted in a stirred-tank reaction if the monomer conversion is less than ~60%. Where monomer conversion is higher than ~60%, which typically results in a highly viscous polymer cement (i.e., mixture of solvent, polymers and any remaining monomer(s)), bulk polymerization can be conducted in an elongated reactor in which the viscous cement is driven by, for example, piston or self-cleaning single- or double-screw agitator.

All components used in or during the polymerization can be combined in a single vessel (e.g., a stirred-tank reactor), and the entirety of the polymerization process can be conducted in that vessel. Alternatively, two or more of the ingredients can be combined outside the polymerization vessel and transferred to another vessel where polymerization of the monomer(s), or at least a major portion thereof, can be conducted.

The polymerization can be carried out as a batch, continuous, or semi-continuous process. The conditions under which the polymerization proceeds can be controlled to maintain the temperature of the polymerization mixture in a range of from −50° to 25° C., generally from −45° to 10° C., commonly from −40° to 0° C., more commonly from −35° to −5° C., and typically from −30° to −10° C. These polymerization temperatures are significantly higher than those possible with other polymerizations employing V compound-based catalysts, which typically must be run below −50° C., often at or about −80° C.

Heat generated by the polymerization can be removed by external cooling by a thermally controlled reactor jacket optionally aided by internal cooling (by evaporation and condensation of the monomer through use of a reflux condenser connected to the reactor). Also, conditions can be controlled to conduct the polymerization under a pressure of from ~0.01 to ~5 MPa, commonly from ~0.05 to ~3 MPa, typically from ~0.1 to ~2 MPa; the pressure at which the polymerization is carried out can be such that the majority of monomers are in the liquid phase. In these or other embodiments, the polymerization mixture may be maintained under anaerobic conditions, typically provided by an inert protective gas such as $N_2$, Ar or He.

Regardless of whether a batch, continuous, or semi-continuous process is employed, the polymerization preferably is conducted with moderate to vigorous agitation.

Where the monomers employed in the polymerization include both a polyene and a $C_2$-$C_8$ α-olefin, the resulting mer typically incorporate in an alternating manner, with the polyene mer incorporating preferentially in a trans-1,4 configuration. A preferred polymerization product is an alternating copolymer of 1,3-butadiene and propylene.

The described polymerization process typically results in at least some polymer chains that possess reactive (pseudo-living) termini, which can be further reacted with one or more functionalizing agents so as to provide polymers with terminal moieties. These types of polymers can be referred to as functionalized and are distinct from a propagating chain that has not been similarly reacted. In one or more embodiments, reaction between the functionalizing agent and the terminally active polymer can proceed via an addition or substitution reaction.

The terminal moiety can be reactive or interactive with other polymer chains (propagating and/or non-propagating) or with other materials in a rubber compound such as particulate reinforcing fillers (e.g., carbon black). As described above, enhanced interactivity between a polymer and particulate fillers in rubber compounds improves the mechanical and dynamic properties of resulting vulcanizates. For example, certain functionalizing agents can impart a terminal moiety that includes a heteroatom to the polymer chain; such a functionalized polymer can be used in rubber compounds from which vulcanizates can be provided, and that vulcanizates can possess high temperature (e.g., 50° C.) hysteresis losses (as indicated by a reduction in high temperature tan δ values) that are less than those possessed by vulcanizates prepared from similar rubber compounds that do not include such functionalized polymers. Reductions in high temperature hysteresis loss can be at least 5%, at least 10%, or even at least 15%.

One or more functionalizing agents can be introduced after a desired monomer conversion is achieved but prior to introduction of a quenching agent (a compound with a protic H atom) or after the polymerization mixture has been partially quenched. The functionalizing agent can be added to the polymerization mixture after a monomer conversion of at least 5%, at least 10%, at least 20%, at least 50%, or at least 80%. In certain embodiments, the functionalizing agent is added after complete, or substantially complete, monomer conversion. In particular embodiments, a functionalizing agent may be introduced to the polymerization mixture immediately prior to, together with, or after the introduction of a Lewis base as disclosed in U.S. Pat. No. 8,324,329.

Useful functionalizing agents include compounds that, upon reaction, provide a functional group at the end of a polymer chain without joining two or more polymer chains together, as well as compounds that can couple or join two or more polymer chains together via a functional linkage to form a single macromolecule. The ordinarily skilled artisan is familiar with numerous examples of terminal functionalities that can be provided through this type of post-polymerization functionalization with terminating reagents, coupling agents and/or linking agents. For additional details, the interested reader is directed to any of U.S. Pat. Nos. 4,015,061, 4,616,069, 4,906,706, 4,935,471, 4,990,573, 5,064,910, 5,153,159, 5,149,457, 5,196,138, 5,329,005, 5,496,940, 5,502,131, 5,567,815, 5,610,227, 5,663,398, 5,567,784, 5,786,441, 5,844,050, 6,812,295, 6,838,526, 6,992,147, 7,153,919, 7,294,680, 7,642,322, 7,671,136, 7,671,138, 7,732,534, 7,750,087, 7,816,483, 7,879,952, 7,902,309, 8,063,153, 8,088,868, 8,183,324, 8,642,706, etc., as well as references cited in these patents and later publications citing these patents. Specific exemplary functionalizing compounds include metal halides (e.g., $SnCl_4$), $R^5_3SnCl$, $R^5_2SnCl_2$, $R^5SnCl_3$, metalloid halides (e.g., $SiCl_4$), carbodiimides, ketones, aldehydes, esters, quinones, N-cyclic amides, N,N'-disubstituted cyclic ureas, cyclic amides, cyclic ureas, Schiff bases, iso(thio)cyanates, metal ester-carboxylate complexes (e.g., dioxytyltin bis(octylmaleate), 4,4'-bis(diethylamino) benzophenone, alkyl thiothiazolines, alkoxysilanes (e.g., $Si(OR^5)_4$, $R^5Si(OR^5)_3$, $R^5_2Si(OR^5)_2$, etc.), cyclic siloxanes, alkoxystannates, and mixtures thereof. (In the foregoing, each $R^5$ independently is a $C_1$-$C_{20}$ alkyl group, $C_3$-$C_{20}$ cycloalkyl group, $C_6$-$C_{20}$ aryl group, or $C_7$-$C_{20}$ aralkyl group.) Commonly used exemplary functionalizing compounds include $SnCl_4$, tributyl tin chloride, dibutyl tin dichloride, and 1,3-dimethyl-2-imidazolidinone.

The amount of functionalizing agent added to the polymerization mixture can depend on various factors including the amount of V-containing compound used, the type of functionalizing agent, the desired level of functionality, etc. In one or more embodiments, the amount of functionalizing agent may be in a range of from ~1 to ~200 moles, commonly from ~5 to ~150 moles, and typically from ~10 to ~100 moles per mole of V-containing compound.

The functionalizing agent can be introduced to the polymerization mixture at a location where the polymerization, or at least a portion thereof, has been conducted (e.g., within a vessel) or at a location distinct therefrom. For example, the functionalizing agent can be introduced to the polymerization mixture in downstream vessels including downstream reactors or tanks, in-line reactors or mixers, extruders, or devolatilizers.

Although not mandatory, if desired, quenching can be performed to inactivate any residual reactive copolymer chains and the catalyst composition. Quenching can be conducted by stirring the polymer and an active hydrogen-containing compound, such as an alcohol or acid, for up to ~120 minutes at temperatures of from 25° to ~150° C. In some embodiments, the quenching agent can include a polyhydroxy compound as disclosed in U.S. Pat. No. 7,879,958. An antioxidant such as 2,6-di-t-butyl-4-methylphenol (BHT) may be added along with, before, or after the addition of the quenching agent; the amount of antioxidant employed can be from ~0.2 to 1% (by wt.) of the polymer product. The quenching agent and the antioxidant can be added neat or, if necessary, dissolved in a hydrocarbon solvent or liquid monomer prior to being added to the polymerization mixture.

Once polymerization, functionalization (if any) and quenching (if any) are complete, the various constituents of the polymerization mixture can be recovered. Unreacted monomers can be recovered from the polymerization mixture by, for example, distillation or use of a devolatilizer. Recovered monomers can be purified, stored, and/or recycled back to the polymerization process.

The polymer product can be recovered from the polymerization mixture using known techniques. For example, the polymerization mixture can be passed through a heated screw apparatus, such as a desolventizing extruder, in which volatile substances (e.g., low boiling solvents and unreacted monomers) are removed by evaporation at appropriate temperatures (e.g., ~100° to ~170° C.) and under atmospheric or sub-atmospheric pressure. Another option involves steam desolvation followed by drying the resulting polymer crumbs in a hot air tunnel. Yet another option involves recovering the polymer directly by drying the polymerization mixture on a drum dryer. Any of the foregoing can be combined with coagulation with water, alcohol or steam; if coagulation is performed, oven drying may be desirable.

Recovered polymer can be grafted with other monomers and/or blended with other polymers (e.g., polyolefins) and additives to form resin compositions useful for various applications. The polymer, regardless of whether further reacted, is particularly suitable for use in the manufacture of various tire components including, but not limited to, tire treads, sidewalls, subtreads, and bead fillers. It also can be used as a compatibilizer for elastomeric blends and/or used in the manufacture of hoses, belts, shoe soles, window seals, other seals, vibration damping rubber, and other industrial or consumer products.

When the resulting polymer is utilized in certain elastomeric compositions, such as those used for tread stock, it can be used alone or blended with any conventionally employed rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, EPR, EPDM, NBR, silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from ~5 to ~99% of the total rubber, with the conventional rubber(s) making up the balance of the total rubber.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2$/g, and useful ranges of surface include from ~32 to ~400 $m^2$/g, ~100 to ~250 $m^2$/g, and ~150 to ~220 $m^2$/g.

The pH of the silica filler is generally from ~5 to ~7 or slightly over, preferably from ~5.5 to ~6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of 1 to 100 phr, commonly in an amount from ~5 to ~80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2$/g, preferably at least ~35 $m^2$/g, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to ~50 phr, with 5 to 40 phr being typical. When carbon black is used with silica, the amount of silica can be decreased to as low as ~1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of ~25%; accordingly, typical (combined) amounts of reinforcing fillers, i.e., silica and carbon black, is ~30 to 100 phr.

When silica is employed as a reinforcing filler, addition of a coupling agent such as a silane is customary so as to ensure good mixing in, and interaction with, the elastomer(s). Generally, the amount of silane that is added ranges between ~4 and 20%, based on the weight of silica filler present in the elastomeric compound.

Coupling agents are compounds which include a functional group capable of bonding physically and/or chemically with a group on the surface of the silica filler (e.g., surface silanol groups) and a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580, 919, 5,583,245, 5,663,396, 5,684,171, 5,684,172, 5,696,197, etc.) or polyorganosiloxanes bearing the types of functionalities mentioned above. An exemplary coupling agent is bis[3-(triethoxysilyl)-propyl]tetrasulfide.

Addition of a processing aid can be used to reduce the amount of silane employed. See, e.g., U.S. Pat. No. 6,525, 118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also can be useful. The additional fillers can be utilized in an amount of up to ~40 phr, typically up to ~20 phr.

Other conventional rubber additives also can be added. These include, for example, process oils, plasticizers, anti-degradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of 120° to 130° C. and increases until a so-called drop temperature, typically 163°±3° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with ~0.2 to ~5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

Various embodiments of the present invention have been provided by way of example and not limitation. As evident from the foregoing descriptions, general preferences regarding features, ranges, numerical limitations and embodiments are to the extent feasible, as long as not interfering or incompatible, envisioned as being capable of being combined with other such generally preferred features, ranges, numerical limitations and embodiments.

The following non-limiting, illustrative examples provide the reader with detailed conditions and materials that can be useful in the practice of the present invention. The catalyst employed in the examples was prepared according to the synthesis procedure described in U.S. Pat. No. 4,189,558.

EXAMPLES

Examples 1-3

Chlorinated Ketone

To previously dried, $N_2$-purged bottles were added hexane, 1,3-butadiene blend in hexane and propylene to provide a 250 g solution containing 30% (w/w) monomers, specifically, 43.9 g 1,3-butadiene and 31.1 g propylene, i.e., 1,3-butadiene provided in a 10% molar excess relative to propylene.

Each bottle was placed in a dry ice/$CCl_4$ bath with vigorous stirring until the solution cooled to −22° C.

To each bottle was added 0.83 mL $VO[OCH_2C(CH_3)_3]_2Cl$ solution (0.45 M in hexane) and 3.3 mL TIBA solution (1.03 M in hexane). This provided ~0.5 mmol V per hundred parts monomer and a TIBA-to-V ratio of 9:1.

The bottle designated Example 1 (comparative) in the following table had no further ingredients added, while the bottles designated Examples 2 and 3 had, respectively, 67 μL and 100 μL neat hexachloroacetone (HCLA) added.

Each polymerization was allowed to proceed at −22° C. for ~4 hours from the time when the last catalyst component was added.

Each polymer cement was quenched with ~5 mL isopropanol containing BHT before being coagulated with a large amount of isopropanol and dried in a drum-dryer at 120° C.

Properties of each of these polymers are summarized in Table 1.

TABLE 1

Catalyst information and polymer properties for Examples 1-3

|  | 1 | 2 | 3 |
|---|---|---|---|
| ratio, HCLA-to-Nd (x:1) | 0 | 2.0 | 3.0 |
| polymer yield (g) | 13.6 | 18.5 | 25.2 |
| monomer conversion (%) | 18.1 | 24.7 | 33.6 |
| $M_n$ (kg/mol) | 60.8 | 61.3 | 68.6 |
| $M_p$ (kg/mol) | 116 | 131 | 147 |
| $M_w/M_n$ | 2.18 | 2.38 | 2.57 |
| propylene (%, mol) butadiene mer | 48.3 | 48.2 | 48.4 |
| vinyl (%, mol) | 1.6 | 1.6 | 1.4 |
| cis-1,4 configuration (%, mol) | 2.0 | 2.1 | 1.9 |
| trans-1,4 configuration (%, mol) | 96.4 | 96.3 | 96.7 |

The data of Table 1 indicate that the presence of a highly halogenated ketone improves catalytic activity (i.e., increased polymer yield relative to an otherwise identical catalyst composition that did not contain an exemplary highly halogenated ketone) and positively impacted molecular weight. These improvements were achieved without significantly affecting the amount and/or configuration of the constituent mer.

Examples 4-5 (Comparative)

Chlorinated Acetate

To previously dried, $N_2$-purged bottles were added hexane, 1,3-butadiene blend in hexane and propylene to provide a 200 g solution containing 30.7% (w/w) monomers, specifically, 34.5 g 1,3-butadiene and 26.9 g propylene, i.e., a 1:1 molar ratio of monomers. Each bottle was placed in a dry ice/xylene bath with vigorous stirring until the solution cooled to about −47° C.

To each bottle was added 0.68 mL $VO[OCH_2C(CH_3)_3]_2Cl$ solution (0.45 M in hexane) and 3.0 mL TIBA solution (1.03 M in hexane). This provided ~0.5 mmol V per hundred parts monomer and a TIBA-to-V ratio of 10:1. The bottle designated Example 4 in the following table had no further ingredients added, while the bottle designated Example 5 had 120 μL neat ethyl trichloroacetate (ECLA) added.

Each polymerization was allowed to proceed at −47° C. for ~4 hours from the time when the last catalyst component was added.

Each polymer cement was processed similarly to the procedure set forth in Examples 1-3, and the properties of those polymers are summarized in Table 2.

TABLE 2

Catalyst information and polymer properties for Examples 4-5

|  | 4 | 5 |
|---|---|---|
| ratio, ECLA-to-Nd (x:1) | 0 | 5.0 |
| monomer conversion (%) | 62.2 | 34.2 |
| $M_n$ (kg/mol) | 120 | 166 |
| $M_p$ (kg/mol) | 377 | 301 |
| $M_w/M_n$ | 3.19 | 2.07 |
| propylene (%, mol) butadiene mer | 48.8 | 48.9 |
| vinyl (%, mol) | 0 | 0 |
| trans-1,4 configuration (%, mol) | 99.0 | 99.2 |
| cis-1,4 configuration (%, mol) | 1.0 | 0.8 |

The data of Table 2 indicate that the presence of halogenated acetate has a deleterious impact on catalytic activity (i.e., decreased conversion relative to an otherwise identical catalyst composition that did not contain the additive).

That which is claimed is:

1. A process of polymerizing ethylenically unsaturated hydrocarbon monomers comprising contacting said monomers with a catalyst composition, said ethylenically unsaturated hydrocarbon monomers consisting of one or more conjugated dienes and propylene, said catalyst composition comprising a vanadium-containing compound and a highly halogenated ketone represented by the general formula

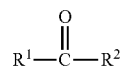

where each of $R^1$ and $R^2$ independently is a $C_1$-$C_8$ (hydro)haloalkyl group represented, respectively by the general formulas $C_mQ_{2m+1}$ and $C_nQ_{2n+1}$ where Q is H or X, with X representing a halogen atom, and m and n each independently is an integer of from 1 to 8 inclusive, with the proviso that the quotient of z/y is from 1 to 2 inclusive, where z represents the total number of Q atoms in the highly halogenated ketone and y represents the total number of Q atoms that are halogen atoms, said contacting of said monomers with said catalyst composition optionally occurring at a temperature of from −10° to −30° C.

2. The process of claim 1 wherein the quotient of z/y is from 1 to 1.75 inclusive.

3. The process of claim 2 wherein the quotient of z/y is from 1 to 1.67 inclusive.

4. The process of claim 3 wherein the quotient of z/y is from 1 to 1.5 inclusive.

5. The process of claim 4 wherein the quotient of z/y is from 1 to 1.4 inclusive.

6. The process of claim 5 wherein the quotient of z/y is from 1 to 1.33 inclusive.

7. The process of claim 6 wherein the quotient of z/y is from 1 to 1.25 inclusive.

8. The process of claim 1 wherein each Q is X.

9. The process of claim 1 wherein the molar ratio of said highly halogenated ketone relative to vanadium is less than 5:1.

10. The process of claim 9 wherein the molar ratio of said highly halogenated ketone relative to vanadium is no more than 4:1.

11. The process of claim 10 wherein the molar ratio of said highly halogenated ketone relative to vanadium is no more than 3:1.

12. The process of claim 1 wherein each of m and n, independently, is from 1 to 4 inclusive.

13. The process of claim 12 wherein each Q is X.

14. The process of claim 1 wherein each Q on each C atom adjacent the carbonyl group of said highly halogenated ketone is X.

15. A process of polymerizing ethylenically unsaturated hydrocarbon monomers comprising contacting said monomers with a catalyst composition, said ethylenically unsaturated hydrocarbon monomers consisting of one or more conjugated dienes and a $C_2$-$C_3$ α-olefin, said catalyst composition comprising a vanadium-containing compound and a highly halogenated ketone represented by the general formula

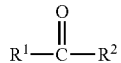

where each of $R^1$ and $R^2$ independently is a $C_1$-$C_8$ (hydro)haloalkyl group represented, respectively by the general formulas $C_mQ_{2m+1}$ and $C_nQ_{2n+1}$ where Q is H or X with the proviso that each Q on each C atom adjacent the carbonyl group of said highly halogenated ketone is X, with X representing a halogen atom, and m and n each independently is an integer of from 1 to 8 inclusive, with the proviso that the quotient of z/y is from 1 to 2 inclusive, where z represents the total number of Q atoms in the highly halogenated ketone and y represents the total number of Q atoms that are halogen atoms, said contacting of said monomers with said catalyst composition occurring at a temperature of from −10° to −30° C.

16. The process of claim 15 wherein each Q is X.

17. The process of claim 15 wherein each of m and n, independently, is from 1 to 4 inclusive, each Q optionally being X.

18. The process of claim 15 wherein each Q on each C atom adjacent the carbonyl group of said highly halogenated ketone is X.

19. The process of claim 15 wherein the product of said polymerization has a number average molecular weight of from 10,000 to 200,000 Daltons.

20. The process of claim 1 wherein the product of said polymerization has a number average molecular weight of from 10,000 to 200,000 Daltons.

* * * * *